United States Patent
Lee et al.

(10) Patent No.: US 7,158,006 B2
(45) Date of Patent: Jan. 2, 2007

(54) MOBILE COMMUNICATION TERMINAL FOR CONTROLLING A VEHICLE USING A SHORT MESSAGE AND METHOD FOR CONTROLLING THE SAME

(75) Inventors: Sun-Gi Lee, Seoul (KR); Kyong-Joon Chun, Seoul (KR); Woo-Yong Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 331 days.

(21) Appl. No.: 10/915,049

(22) Filed: Aug. 10, 2004

(65) Prior Publication Data

US 2005/0073388 A1    Apr. 7, 2005

(30) Foreign Application Priority Data

Oct. 1, 2003  (KR)  .................. 10-2003-0068305

(51) Int. Cl.
 *H04Q 1/00* (2006.01)
(52) U.S. Cl. ..................... 340/5.61; 340/5.72
(58) Field of Classification Search ............. 340/5.1, 340/5.8, 5.61, 5.72, 7.1, 825.69, 426.13, 340/426.14, 426.15, 426.16, 426.17, 426.36, 340/539.1; 701/1; 307/10.1; 455/466, 420, 455/556.1

See application file for complete search history.

(56) References Cited

U.S. PATENT DOCUMENTS

| | | | | |
|---|---|---|---|---|
| 6,393,297 | B1 * | 5/2002 | Song ......................... | 455/466 |
| 6,803,854 | B1 * | 10/2004 | Adams et al. .............. | 340/531 |
| 2002/0180582 | A1 * | 12/2002 | Nielson ..................... | 340/5.6 |
| 2003/0194089 | A1 * | 10/2003 | Kansala et al. ............ | 380/270 |
| 2005/0159175 | A1 * | 7/2005 | Zhou et al. ................ | 455/466 |

\* cited by examiner

*Primary Examiner*—Edwin C. Holloway, III
(74) *Attorney, Agent, or Firm*—The Farrell Law Firm (57) ABSTRACT

A mobile terminal for controlling a vehicle using a short message by establishing authentication information to establish mutual authentication between the vehicle acting and a mobile terminal. The mobile terminal requests initial information needed for an automatic control function from the vehicle using the authentication information, and checks the vehicle's automatic control available items associated with the initial information received from the vehicle. Upon receiving user's selection information needed for the automatic control function, the mobile terminal generates a short message containing a control command corresponding to items from among the checked automatic control available items, and transmits the short message to the vehicle. The user uses a short message in a mobile communication network to remotely control a vehicle. User interface using icons allow the user to conveniently control the vehicle at a remote site.

23 Claims, 9 Drawing Sheets

MOBILE COMMUNICATION TERMINAL FOR CONTROLLING A VEHICLE USING A SHORT MESSAGE AND METHOD FOR CONTROLLING THE SAME

PRIORITY

This application claims priority to an application entitled "MOBILE COMMUNICATION TERMINAL FOR CONTROLLING VEHICLE USING SHORT MESSAGE AND METHOD FOR CONTROLLING THE SAME", filed in the Korean Intellectual Property Office on Oct. 1, 2003 and assigned Serial No. 2003-68305, the contents of which are hereby incorporated by reference.

BACKGROUND OF THE INVENTION

1. Field of the Invention

The present invention relates to a mobile communication terminal (also called a mobile terminal) for controlling a vehicle using a short message such as an SMS message and a method for controlling the same, and more particularly to a mobile terminal and method for providing a user with a simple user interface to enable the user to easily control a vehicle at a remote site using his or her mobile terminal, and at the same time recognize a current status of the vehicle.

2. Description of the Related Art

Typically, a remote control device (also called a remote-controller) has been adapted to control a vehicle at a remote site. In this case, if a user transmits vehicle control information at a specific frequency to a destination using the remote-controller at a nearby position of the vehicle, the vehicle receives vehicle control information from the remote-controller, analyzes the received information, and performs a necessary operation associated with the received information. In this case, the user must carry the remote-controller to control the vehicle, resulting in greater inconvenience for the user. The less the size of the remote-controller, the less the number of control commands that can readily be transmitted using the remote-controller.

There has also been proposed a method for allowing a mobile terminal to establish a call-connection state with a communication module contained in a vehicle. In this case, the mobile terminal makes a telephone call to the communication module of the vehicle, and transmits a DTMF (Dual Tone Multi-Frequency) signal corresponding to a predetermined control command to the vehicle, such that the vehicle having information associated with the control command corresponding to the DTMF signal can recognize the control command corresponding to the received DTMF signal and can perform a necessary operation corresponding to the recognized control command. The aforementioned method for enabling the user to establish a call-connection state with the communication module of a vehicle must perform a predetermined vehicle control operation upon receiving an information message from the vehicle, resulting in greater inconvenience for the user, an increased unnecessary time consumption, and increased communication charges assessed to the user.

In the meantime, there has recently been proposed yet another method for controlling a vehicle using an additional communication module (e.g., Infra-red Data Association (IrDA)-based or Bluetooth-based systems) built in the terminal or vehicle. However, this method has a disadvantage in that it must satisfy a predetermined communication specification for use and the communication modules must be built into the terminal and the vehicle, resulting in increased production costs. In addition, the communication module has been designed only for a wireless LAN (Local Area Network), such that it cannot control the vehicle at a remote site. In other words, the communication module can remotely control the vehicle only when a distance between the vehicle and the communication module is shorter than a relatively short predetermined distance, resulting in greater inconvenience for the user.

SUMMARY OF THE INVENTION

Therefore, the present invention has been made in view of the above problems, and it is an object of the present invention to provide an apparatus and method for enabling a user to remotely control a vehicle from anywhere he or she wishes without limitation in distance from the user to the vehicle.

It is another object of the present invention to provide a method for enabling a user to control a vehicle at a remote site using only a mobile terminal without using a separate device designed specifically for vehicle control.

It is yet another object of the present invention to provide an apparatus and method for providing a user with a simple user interface so that the user can conveniently control a vehicle at a remote site.

It is yet another object of the present invention to provide an apparatus and method for transmitting a control command over a short message data area so that it can control one or more control items.

In accordance with one aspect of the present invention, the above and other objects can be accomplished by the provision of a mobile terminal apparatus, comprising: a control command manager for storing/managing an automatic control icon pre-registered to implement an automatic control function of a vehicle acting as a control target, control commands associated with the automatic control icon, and authentication information needed to establish mutual authentication between the vehicle and the mobile terminal; a controller for receiving a request command from a user to establish the vehicle's automatic control function, and generating a control signal needed for the vehicle's automatic control function using a short message communicated between the vehicle and the mobile terminal; a display controller for reading the automatic control icons from the control command manager upon receiving a control signal from the controller, and displaying the read icons; a short message generator for generating a short message needed for the vehicle's automatic control function upon receiving a control signal from the controller; and an RF (Radio Frequency) unit for transmitting the short message generated by the short message generator to the vehicle upon receiving a control signal from the controller, receiving a response message from the vehicle, and transmitting the received response message to the controller.

In accordance with another aspect of the present invention, there is provided a method for controlling a vehicle using a short message, comprising the steps of setting up authentication information to establish mutual authentication between the vehicle acting as a control target and a mobile terminal; controlling the mobile terminal to request initial information needed for an automatic control function from the vehicle using the authentication information, and controlling the mobile terminal to check vehicle's automatic control available items associated with the initial information received from the vehicle; upon receiving user's selection information needed for the automatic control function, generating a short message containing a control command corresponding to more than one item from among the checked automatic control available items; and transmitting the short message to the vehicle.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the drawings, the same or similar elements are denoted by the same reference numerals even when depicted in different drawings. In the following description, a detailed description of known functions and configurations incorporated herein will be omitted to avoid making the subject matter of the present invention unclear.

Figure 1:
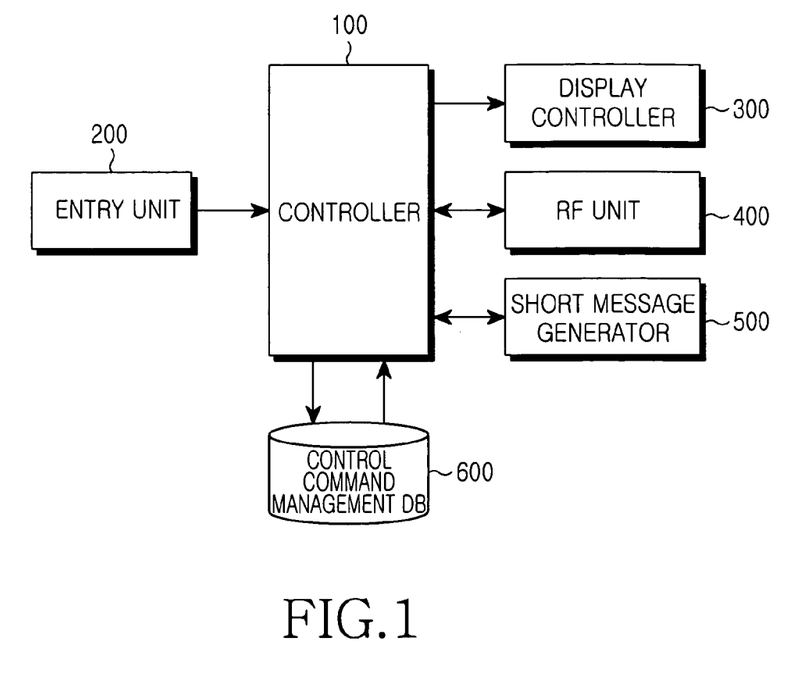
FIG. 1 is a block diagram illustrating a mobile terminal in accordance with a preferred embodiment of the present invention.

FIG. 1 is a block diagram illustrating a mobile terminal in accordance with a preferred embodiment of the present invention. Referring to FIG. 1, the mobile terminal for use in the present invention includes a controller 100, an entry unit 200, a display controller 300, an RF (Radio Frequency) unit 400, a short message generator 500, and a control command management DB (DataBase) 600.

The entry unit 200 receives a control command from a user. Upon receiving a request command from a user to automatically control a vehicle, the controller 100 communicates a short message between the vehicle acting as an automatic control target and the mobile terminal to generate a control signal for automatically controlling the vehicle. Upon receiving the request command from the user to automatically control the vehicle, the controller 100 generates at least one of a plurality of control signals, i.e. an authentication information setup control signal for setting up authentication information communicated between the vehicle and the mobile terminal, an initial information request control signal for requesting initial information needed for the automatic control function from the vehicle, an automatic control execution control signal for carrying out the automatic control function, and a display control signal for controlling a display state. It should be noted that the controller 100 generates a control signal needed for a unique communication function of the mobile terminal along with the aforementioned control signals.

The control command management DB 600 stores/manages a pre-registered icon for implementing the vehicle's automatic control function, control commands associated with the icon, and authentication information needed to establish mutual authentication between an automatic control target vehicle and the mobile terminal. Preferably, the control command management DB 600 may further include malfunction indication icon information corresponding to the stored automatic control icon to enable display of malfunction state information associated with vehicle's automatic control items.

The display controller 300 reads the automatic control icons from the control command management DB 600 upon receiving the control signal from the controller, and displays the icons. Particularly, upon receiving a display control signal from the controller 100, the display controller 300 displays only an icon corresponding to an automatic control available item of the vehicle acting as an automatic control target, such that the icon is displayed in the form of a user-selectable icon. In other words, although the control command management DB 600 stores/manages all the automatic control icon information provided for a corresponding mobile terminal, it will preferably activate only an icon corresponding to a true automatic control target item from among all the icon information. For example, provided that a vehicle registered as an automatic control target vehicle in the mobile terminal denies an automatic control operation of a window up/down function even though the control command management DB 600 stores icon information corresponding to the window up/down function, the display controller 300 inactivates the icon information corresponding to the window up/down function such that the user cannot select the icon.

Upon receiving a display control signal from the controller 100, the display controller 300 determines which one of the automatic control items of the vehicle indicates a current malfunction, reads corresponding malfunction icon information from the control command management DB 600, and displays the read information. For example, upon receiving initial information indicative of an interior light (also called a room lamp) malfunction from the vehicle acting as an automatic control target, the display controller 300 overlaps a specific character image 'X' with a corresponding icon indicative of an interior light on/off function, such that it indicates a current malfunction state of the vehicle's interior light.

The short message generator 500 generates a short message to be transmitted over a mobile communication network. Particularly, the short message generator 500 generates a short message for automatically controlling the vehicle upon receiving a control signal from the controller 100. In other words, upon receiving the control signal from the controller 100, the short message generator 500 generates a first short message for setting up authentication information to establish mutual authentication between the vehicle and the mobile terminal, a second short message for requesting initial information needed to perform the vehicle's automatic control function from the vehicle, and a third short message for automatically controlling the vehicle.

In more detail, the short message generator 500 receives an authentication information setup control signal from the controller 100, determines a vehicle recognition number (e.g. a vehicle telephone number) as a destination, and generates the first short message composed of a phone number of the mobile terminal and a user-predetermined automatic control authentication password. A representative format of the first short message 10 is shown in FIG. 2.

Figure 2:
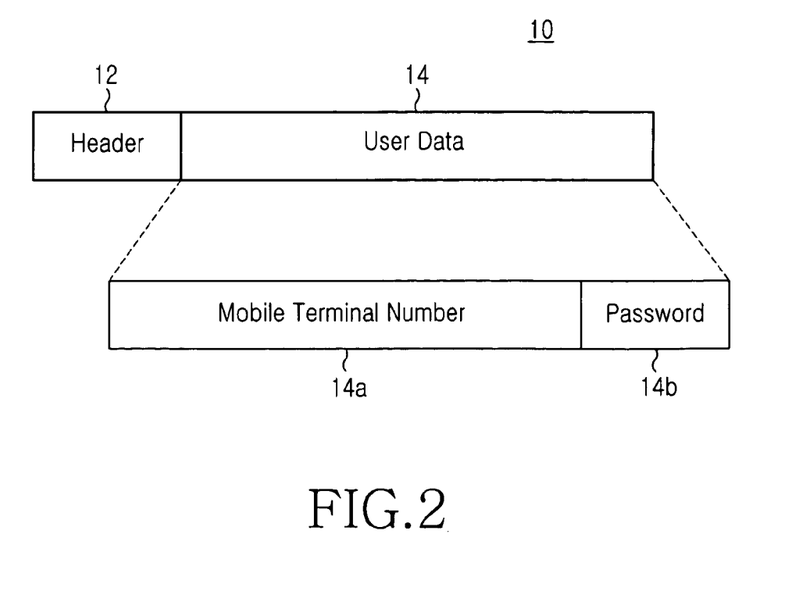
FIG. 2 is an exemplary configuration illustrating a short message transmitted during an initial authentication process in accordance with a preferred embodiment of the present invention.

FIG. 2 is an exemplary configuration illustrating a short message transmitted during an initial authentication process in accordance with a preferred embodiment of the present invention. Referring to FIG. 2, the short message (i.e. the first short message) 10 transmitted from the mobile terminal to the vehicle acting as an automatic control target during the initial authentication process includes a mobile terminal's phone number (denoted as Mobile Terminal Number) 14a and a user-predetermined automatic control authentication password 14b in a user data area 14. In this case, an ID (Identification) instead of the mobile terminal's phone number may be stored in the mobile terminal number area 14a. The vehicle telephone number determined to be a destination of a corresponding short message is stored in a header area 12. A predetermined message classification recognition code for determining a corresponding short message to be a vehicle control short message distinguished from a general short message is stored in the header area 12.

Upon receiving an initial information request control signal from the controller 100, the short message generator 500 determines a vehicle telephone number of a control target vehicle to be a destination, and generates the second short message composed of a phone number of the mobile terminal, a user-predetermined automatic control authentication password, and an initial information request flag. A representative format of the second short message 20 is shown in FIG. 3.

Figure 3:
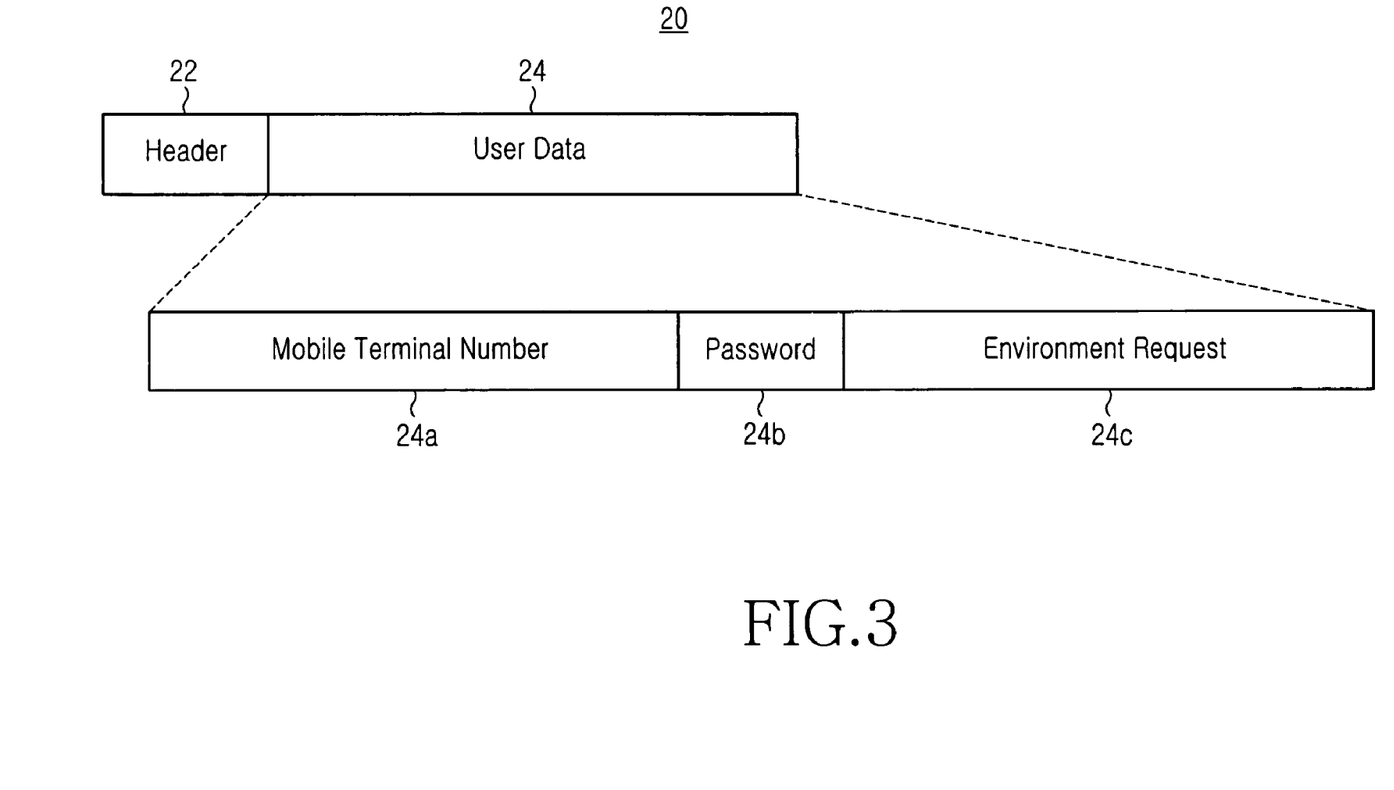
FIGS. 3 and 4 are exemplary views illustrating short messages transmitted during an initial information request and response process in accordance with a preferred embodiment of the present invention.

FIG. 3 is an exemplary view illustrating a short message transmitted from the mobile terminal to the vehicle during the initial information request process in accordance with a preferred embodiment of the present invention. Referring to FIG. 3, the short message (i.e. the second short message) 20 transmitted from the mobile terminal to the vehicle acting as an automatic control target during the initial information request process includes a mobile terminal's phone number (denoted as Mobile Terminal Number) 24a, a user-predetermined automatic control authentication password 24b, and an initial information request flag (denoted as Environment Request) 24c in a user data area 24. In this case, an additional ID instead of the mobile terminal's phone number may be stored in the mobile terminal number area 24a. The vehicle telephone number determined to be a destination of a corresponding short message is stored in a header area 22. A predetermined message classification recognition code for determining a corresponding short message to be a vehicle control short message distinguished from a general short message is stored in the header area 22.

Figure 4:
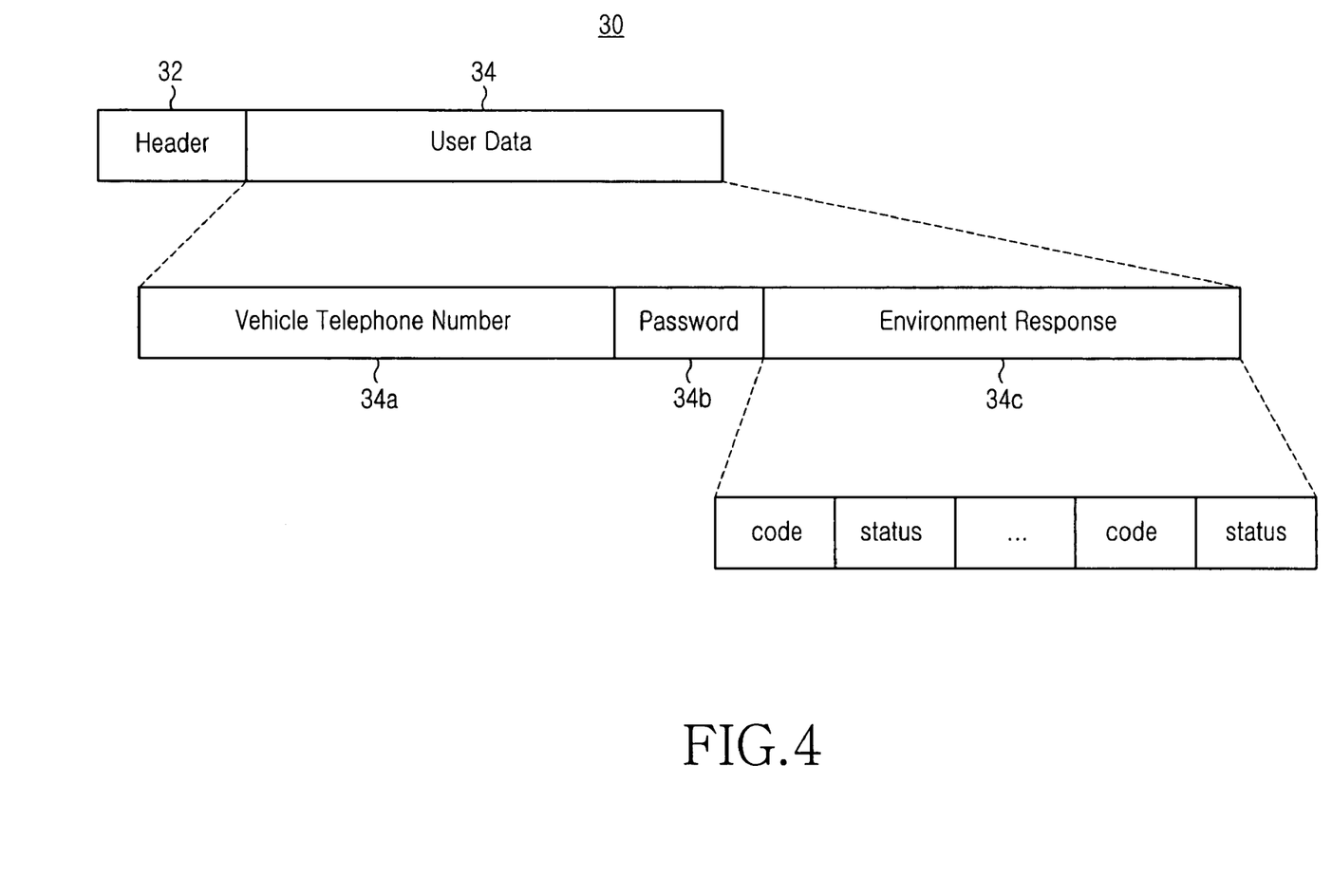

FIG. 4 is an exemplary format of a short message 30 transmitted from the vehicle to the mobile terminal as a response to the second short message 20 shown in FIG. 3, and its detailed description will be described later.

Figure 5:
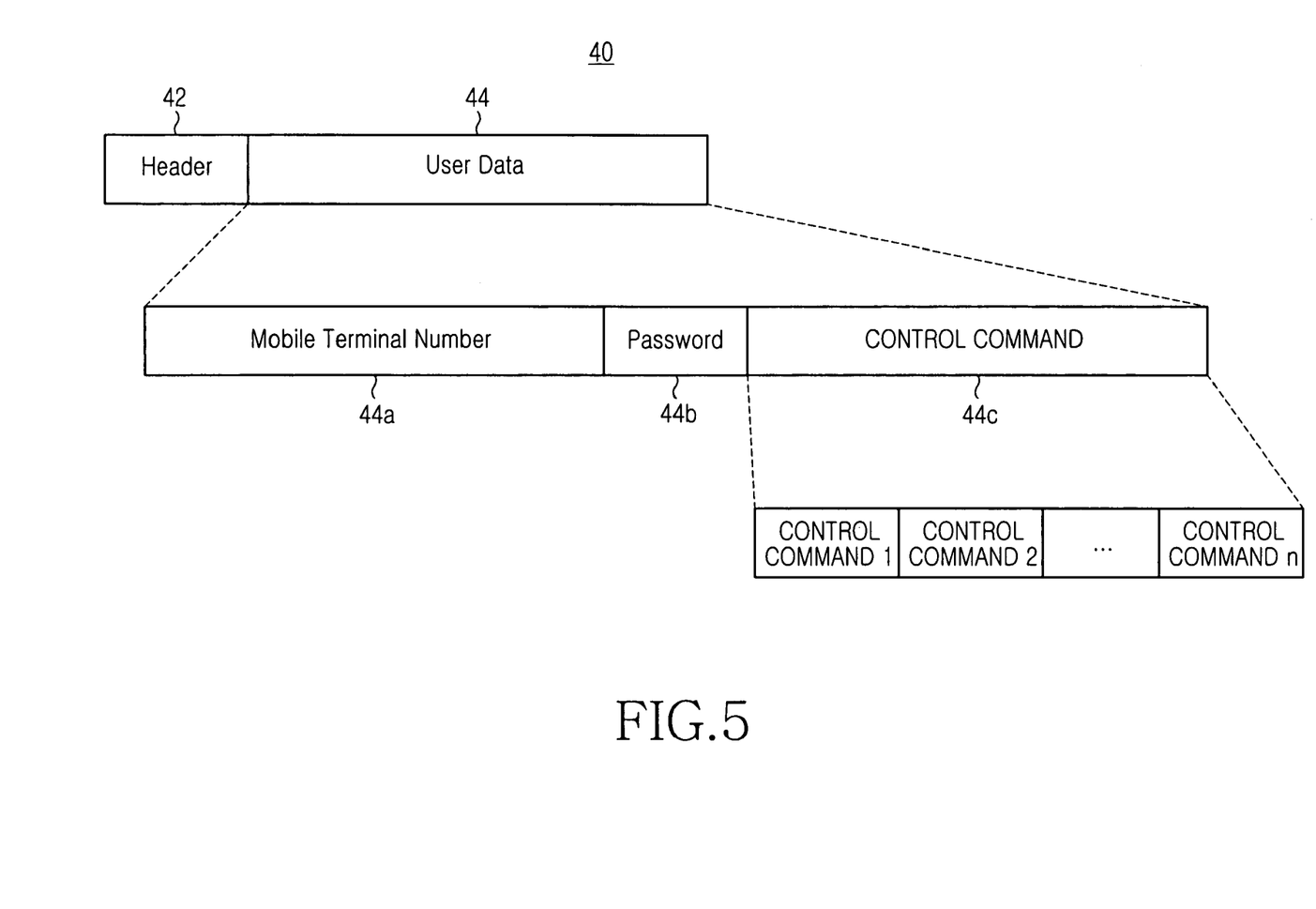
FIG. 5 is an exemplary configuration illustrating a short message transmitted during an automatic control process in accordance with a preferred embodiment of the present invention.

The short message generator 500 receives an automatic control execution control signal from the controller 100, determines a vehicle telephone number pre-registered in the mobile terminal to be a destination, and generates a third short message composed of more than one user-selected automatic control item and a user-predetermined automatic control authentication password. A representative example of the third short message 40 is shown in FIG. 5. FIG. 5 is an exemplary configuration illustrating a short message transmitted during an automatic control process in accordance with a preferred embodiment of the present invention.

Referring to FIG. 5, the short message (i.e. the third short message) 40 transmitted from the mobile terminal to the vehicle acting as an automatic control target during the automatic control process includes a mobile terminal's phone number (denoted as Mobile Terminal Number) 44a, a user-predetermined automatic control authentication password 44b, and a control command 44c in a user data area 44. In this case, the control command area 44c may include a plurality of control commands, and an ID instead of the mobile terminal's phone number may be stored in the mobile terminal number area 44a. The vehicle telephone number determined to be a destination of a corresponding short message is stored in a header area 42. The predetermined message classification recognition code for determining a corresponding short message to be a vehicle control short message distinguished from a general short message is stored in the header area 42.

The telephone number of the vehicle acting as a destination of a corresponding short message is stored in the header area 42.

The RF unit 400 transmits/receives radio data to/from a mobile communication network. Particularly, upon receiving a control signal from the controller 100, the RF unit 400 transmits a short message generated by the short message generator 500 to the vehicle acting as an automatic control target over the mobile communication network, receives a response message from the vehicle over the mobile communication network, and transmits the received response message to the controller 100. A representative example of the response message 30 is shown in FIG. 4.

FIG. 4 is an exemplary format of the response message 30 transmitted from the vehicle to the mobile terminal as a response to the second short message 20 shown in FIG. 3.

Referring to FIG. 4, the response message 30 includes the vehicle telephone number 34a of a vehicle acting as an automatic control target, the user-predetermined automatic control authentication password (denoted as Password) 34b, and an initial information response message 34c (denoted as Environment Response) in a user data area 34. In this case, the initial information response message (Environment Response) 34c includes an automatic control item code and its control state (e.g. malfunction or normal operation). An ID instead of the vehicle telephone number may be stored in the vehicle telephone number area 34a. The mobile terminal number or ID of the mobile terminal acting as a destination of a corresponding short message is stored in the header area 32. A predetermined message classification recognition code for determining a corresponding short message to be a vehicle control short message distinguished from a general short message is stored in the header area 32.

Figure 6:
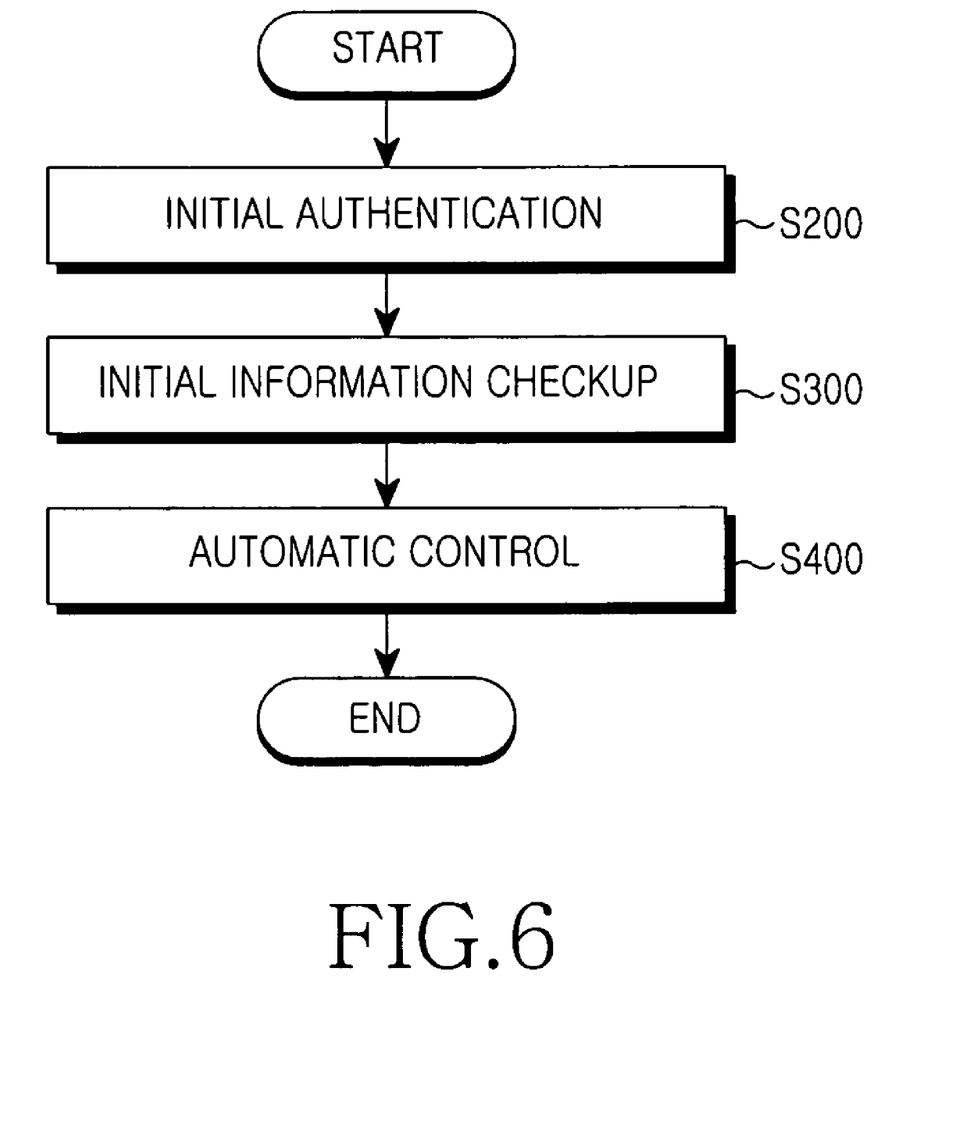
FIG. 6 is a flow chart illustrating a vehicle control method in accordance with a preferred embodiment of the present invention.

FIG. 6 is a flow chart illustrating a vehicle control method in accordance with a preferred embodiment of the present invention.

Referring to FIG. 6, the controller 100 sets up authentication information to establish mutual authentication between the vehicle acting as a control target and the mobile terminal at step S200. In more detail, the controller 100 registers information of the vehicle in the mobile terminal, and controls a password needed for the mutual authentication to be shared between the vehicle and the mobile terminal. A detailed description will hereinafter be described with reference to FIG. 7, which will be described later.

If the authentication information has been established between the vehicle and the mobile terminal, the mobile terminal requests initial information needed for the automatic control function from the vehicle acting as a control target using the authentication information, and determines a vehicle's automatic control available item corresponding to the initial information received from the vehicle at step S300. A detailed description will hereinafter be described with reference to FIG. 8, which will be described later.

If the initial information checkup step S300 has been performed, the controller automatically controls the vehicle acting as the automatic control target on the basis of the user's selection of information needed for the automatic control function at step S400. In more detail, the short message generator 500 generates a short message containing a control command corresponding to more than one item from among the checked automatic control available items on the basis of the user's selection information, and transmits the short message having the control command to the vehicle acting as the control target. A detailed description will be given with reference to FIG. 9, which will be described later.

Figure 7:
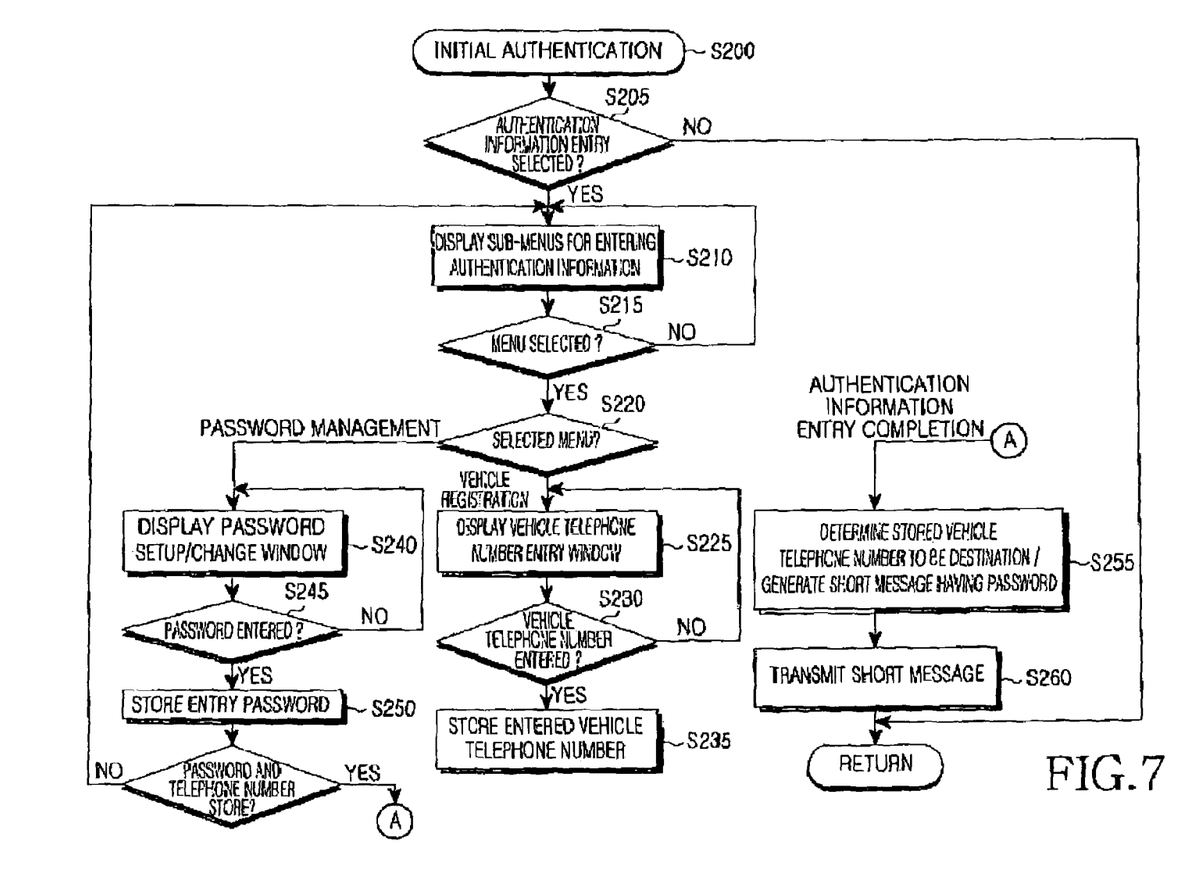
FIG. 7 is a flow chart illustrating an initial authentication process for controlling a vehicle in accordance with a preferred embodiment of the present invention.

FIG. 7 is a flow chart illustrating the initial authentication process S200 for controlling the vehicle in accordance with a preferred embodiment of the present invention.

If a user selects an authentication information entry function from among a plurality of menus displayed on the mobile terminal at step S205, the mobile terminal displays a plurality of sub-menus (e.g. "Vehicle registration", "Password management", and "Authentication information entry completion", etc.) needed to enter authentication information at step S210. It is preferable for all the menus to be displayed in the form of icons for user convenience. The aforementioned description is commonly applied to all the contents of this disclosure.

If the user selects a desired menu from among many sub-menus at step S215, the controller 100 checks, i.e. selects, the selected menu at step S220, and performs a predetermined operation corresponding to the selected menu.

In more detail, if the user selects the vehicle registration menu, the mobile terminal displays a vehicle telephone number entry window at step S225. If the user enters a telephone number of a vehicle acting as an automatic control target at step S230, the mobile terminal stores the vehicle telephone number at step S235, and returns to step S210 for displaying a sub-menu needed to enter authentication information.

If the user selects the password management menu, the mobile terminal displays a password setup/change window at step S240. If the user enters an automatic control authentication password at step S245, the mobile terminal stores the entered password at step S250, and returns to step S210 for displaying a sub-menu needed to enter authentication information.

In the meantime, if the user stores the vehicle telephone number and the password in the mobile terminal and selects the authentication information entry completion menu, the mobile terminal determines the stored vehicle telephone number to be a destination, generates a short message having the password at step S255, and transmits the short message to the vehicle at step S260. The vehicle analyzes the received short message, and stores the phone number and password information of the mobile terminal in the form of authentication information needed for the automatic control function. A representative example of the short message generated at step S255 is shown in FIG. 2.

Figure 8:
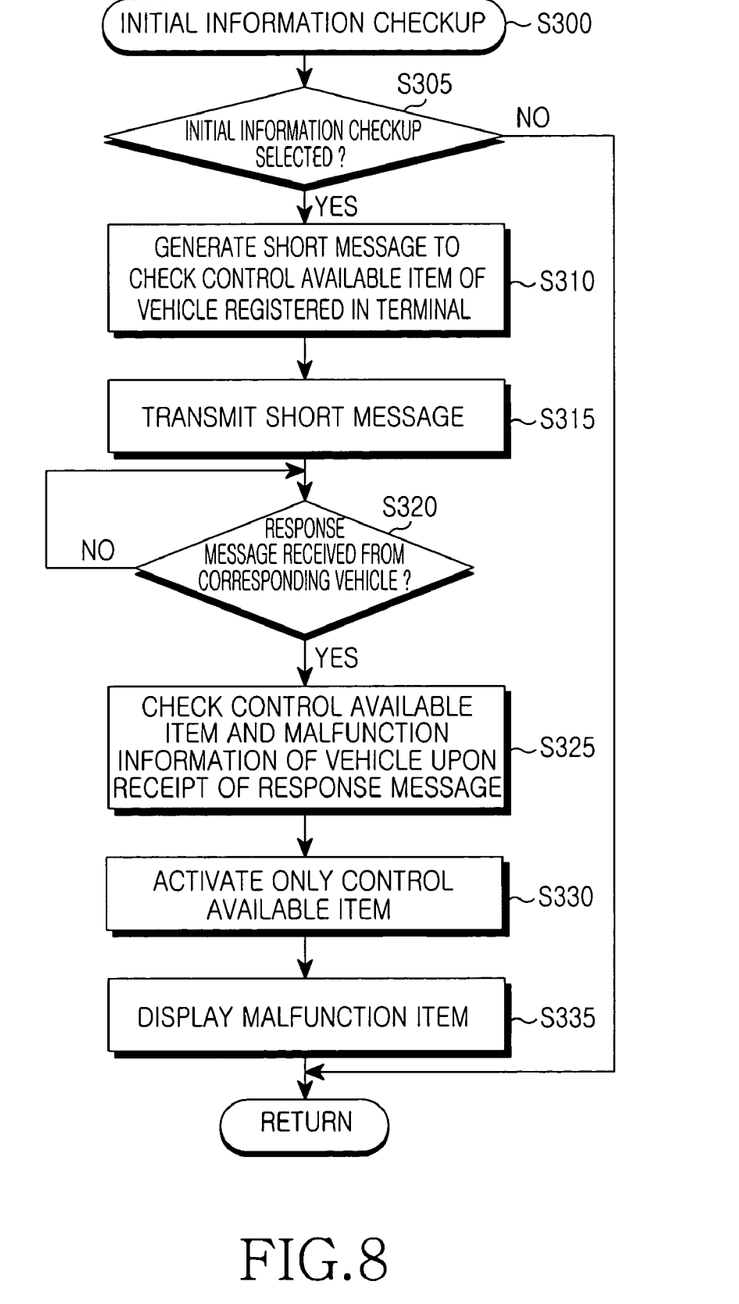
FIG. 8 is a flow chart illustrating an initial information checkup process for controlling a vehicle in accordance with a preferred embodiment of the present invention.

FIG. 8 is a flow chart illustrating the initial information checkup process S300 for controlling a vehicle in accordance with a preferred embodiment of the present invention.

Referring to FIG. 8, if a mobile terminal user selects an initial information checkup menu from among a plurality of menus provided from the mobile terminal at step S305, the mobile terminal generates a short message to check an automatic control available item of the vehicle pre-registered at steps S225 to S235 (FIG. 7) as an automatic control target at step S310. A representative example of the generated short message format is shown in FIG. 3. In more detail, the mobile terminal receives an automatic control authentication password from the user, generates a short message composed of the received password, the mobile terminal phone number, and an initial information request flag, and transmits the generated short message to the vehicle acting as the automatic control target at step S315. In this case, the generated short message determines the vehicle telephone number pre-stored in the mobile terminal to be a destination.

When the vehicle receives the short message and determines the validity of the initial information request flag using the password contained in the short message, the mobile terminal receives a response message to the short message from the vehicle at step S320. A representative example of the response message format is shown in FIG. 4.

The mobile terminal determines a vehicle control available item corresponding to the received response message, and determines if a specific function associated with the control available item is normally operated at step S325, such that it activates only the item determined to be such a control available item at step S330. If it is determined that the specific function associated with the control available item is currently malfunctioning, the mobile terminal displays the malfunction item at step S335.

Figure 9:
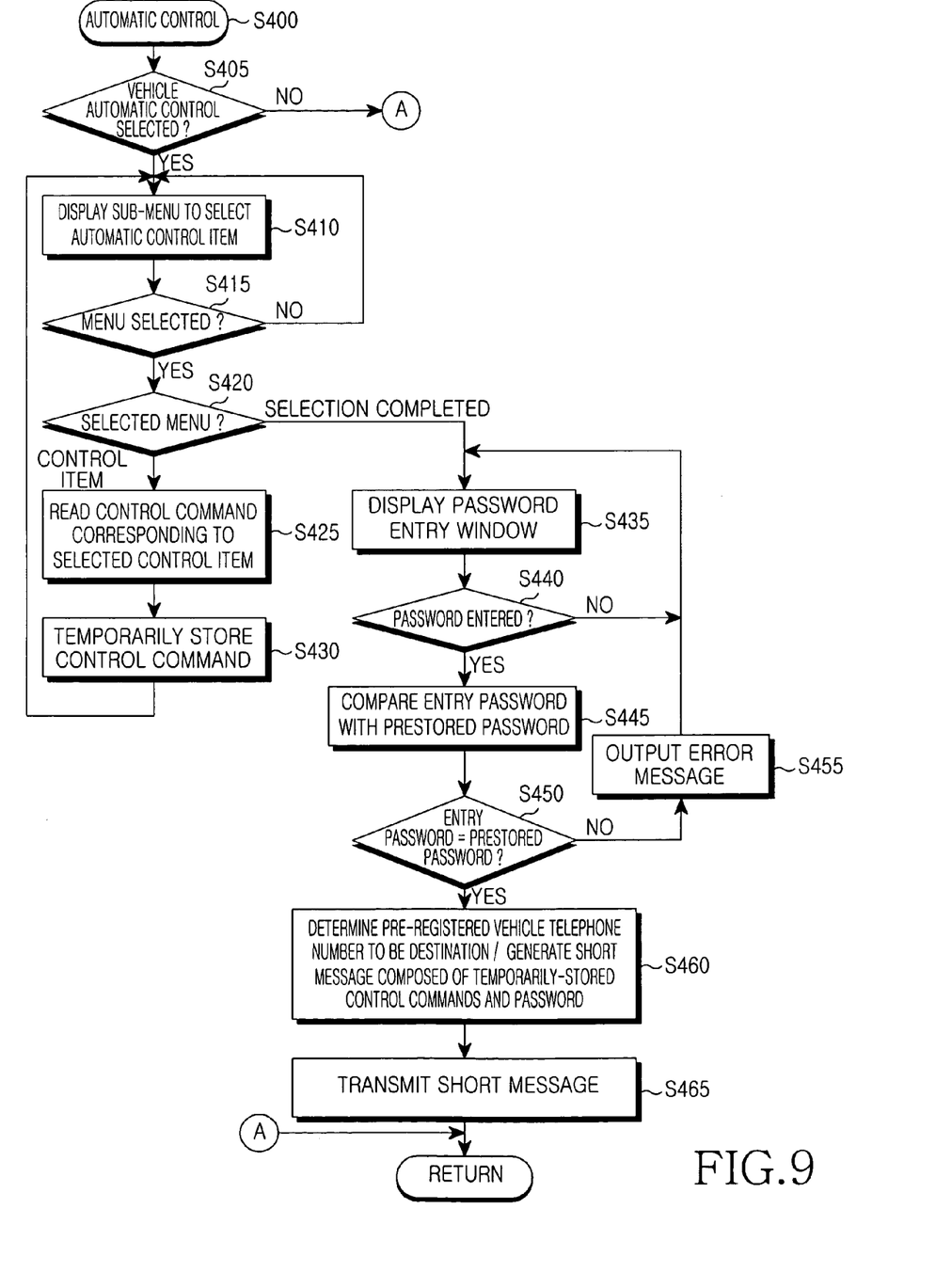
FIG. 9 is a flow chart illustrating an automatic control process for controlling a vehicle in accordance with a preferred embodiment of the present invention.

FIG. 9 is a flow chart illustrating the automatic control process S400 for controlling a vehicle in accordance with a preferred embodiment of the present invention.

Referring to FIG. 9, if a user selects a vehicle automatic control menu from among a plurality of menus displayed on the mobile terminal at step S405, the mobile terminal displays sub-menus associated with the selected vehicle automatic control menu at step S410. Preferably, the mobile terminal may display automatic control available items of the vehicle and a selection completion menu in the form of the sub-menus needed to select the vehicle automatic control menu.

If the user selects a specific sub-menu from among many sub-menus at step S415, the mobile terminal determines which one of the sub-menus is selected at step S420. If the selected menu is determined to be a control item, the mobile terminal reads a control command corresponding to the selected control item at step S425, and temporarily stores the read control command at step S430. In this case, the mobile terminal repeats steps S410 to S430, and stops repeating the steps S410 to S430 when the user selects the selection completion menu such that it displays a password entry window at step S435 to receive more than one item needed for the automatic control function from the user.

The password is adapted to verify that a corresponding user is authorized to carry out an automatic control function of the target vehicle. If the user enters a password on the password entry window at step S440, the mobile terminal compares the entry password with a pre-stored password at step S445. If it is determined that the entry password is different from the pre-stored password at step 445, the mobile terminal outputs an error message corresponding to the determination result at step S455. If it is determined that the entry password is equal to the pre-stored password at step 450, the mobile terminal determines a pre-registered vehicle telephone number to be a destination, generates an automatic control short message composed of the temporarily-stored control commands and password at step S460, and transmits the short message to the target vehicle at step S465.

FIGS. 10a to 10d are exemplary screen images displayed on the mobile terminal for controlling the vehicle in accordance with a preferred embodiment of the present invention. Particularly, the screen images shown in FIGS. 10a to 10d are exemplarily applied to a mobile phone.

Figure 10A:
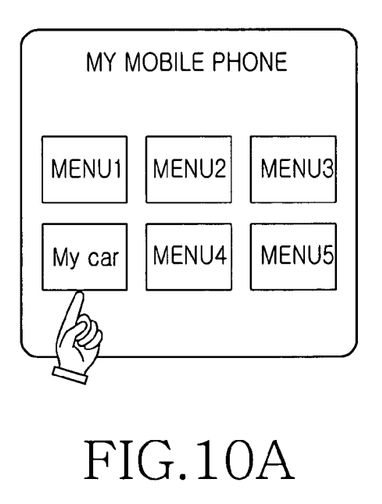
FIGS. 10a to 10d are exemplary screen images displayed on a mobile terminal for controlling a vehicle in accordance with a preferred embodiment of the present invention.

FIG. 10a is an example of an initial screen image of the mobile phone, and includes a plurality of menus "MENU1" to "MENU5" and a vehicle automatic control menu "My Car". The screen image of FIG. 10a is the highest-order image from among a plurality of screen images FIGS. 10a to 10d.

Figure 10B:
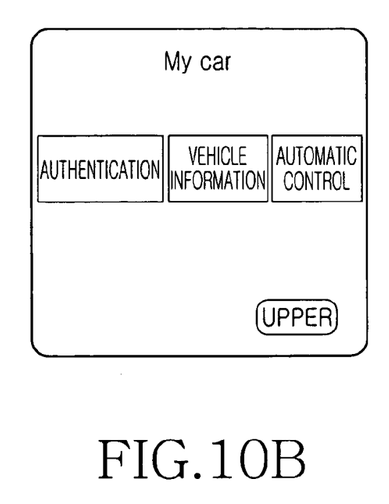

FIG. 10b is an example of a screen image provided when the "My Car" menu is selected. In more detail, FIG. 10b includes a plurality of sub-menus of the "My Car" menu, i.e., "Authentication", "Vehicle Information", and "Automatic Control" sub-menus. If the user selects a specific menu "Upper" from among a plurality of menus displayed in FIG. 10b, the mobile phone displays the screen image of FIG. 10a.

Figure 10C:
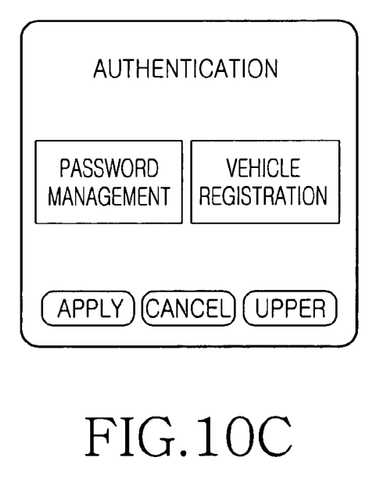

FIG. 10c is an example of a screen image provided when the "Authentication" menu is selected. In more detail, FIG. 10c includes a plurality of sub-menus of the "Authentication" menu, i.e. "Password Management" and "Vehicle Registration" sub-menus. A specific menu "Apply" displayed at the bottom of the screen image of FIG. 10c is adapted to apply predetermined information to the mobile phone. A specific menu "Cancel" displayed at the bottom of the screen image of FIG. 10c is adapted to cancel the predetermined information. A specific menu "Upper" displayed at the bottom of the screen image of FIG. 10c is adapted to display an upper mode (e.g. screen image of the "My Car" menu) image of a current display screen image.

Figure 10D:
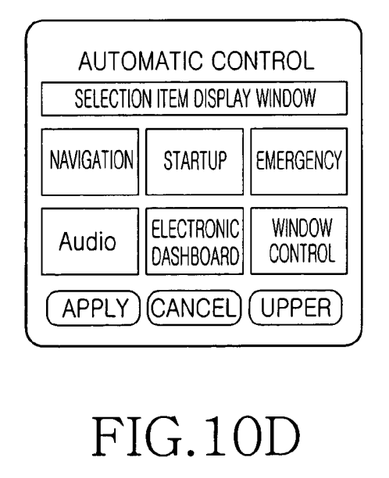

FIG. 10d is an example of a screen image provided when the "Automatic Control" menu is selected. In more detail, FIG. 10d includes a plurality of sub-menus of the "Automatic Control" menu, i.e. "Navigation", "Startup", "Window Control", "Emergency", "Audio", and "Electronic Dashboard", etc. Particularly, a selection item display window for displaying a user-selected item from among the displayed automatic control items is further displayed on FIG. 10d. Other menus "Apply", "Cancel", and "Upper" displayed at the bottom of the screen image of FIG. 10d are the same as those of FIG. 10c.

As apparent from the above description, the present invention uses a short message transmission service over a mobile communication network, such that it can enable a user to remotely control a vehicle from anywhere he or she wishes without limitation in distance between the user and the vehicle. The present invention enables the user to control the vehicle at a remote site using only a mobile terminal without using an additional device (e.g. a wireless remote-controller, etc.) designed for only vehicle control implementation, such that the user can freely control the vehicle at a remote site. Furthermore, the present invention displays a plurality of menus needed to perform the vehicle control function in the form of icons so that the user can more conveniently control the vehicle at a remote site. The present invention transmits a control command to a target object over a short message data area so that it can control more than one control item at one time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a vehicle using a short message, comprising the steps of:
    a) setting up authentication information to establish mutual authentication between the vehicle acting as a control target and a mobile terminal;
    b) controlling the mobile terminal to request initial information needed for an automatic control function from the vehicle using the authentication information, and controlling the mobile terminal to allow a user to select from among the vehicle's automatic control available items associated with the initial information received from the vehicle;
    c) upon receiving the user's selection information needed for the automatic control function, generating a short message containing a control command corresponding to more than one item from among the selected automatic control available items; and
    d) transmitting the generated short message to the vehicle.

2. The method as set forth in claim 1, further comprising:
    e) controlling the mobile terminal having received the initial information from the vehicle to display only an automatic control available item of the vehicle in the form of a user-selectable state based on the received initial information.

3. The method as set forth in claim 2, wherein step (e) further includes displaying the automatic control available item in the form of an icon.

4. The method as set forth in claim 1, further comprising determining whether one of the vehicle's automatic control available items indicates a malfunction upon receiving the initial information from the vehicle, and displaying the determined malfunction item.

5. The method as set forth in claim 4, wherein step (f) further includes displaying the malfunction item in the form of an icon.

6. The method as set forth in claim 1, wherein step (a) further includes the steps of:
    a1) storing a telephone number of the vehicle in the mobile terminal;
    a2) storing a password in the mobile terminal, determining the vehicle telephone number to be a destination, and generating a short message composed of a phone number of the mobile terminal and the password; and
    a3) transmitting the short message to the vehicle such that the vehicle can store the phone number or ID of the mobile terminal and the password in the form of automatic control authentication information.

7. The method as set forth in claim 6, wherein step (a2) further includes generating a short message where a message classification recognition code indicative of a vehicle control short message is included in a header area.

8. The method as set forth in claim 6, wherein step (b) further includes:
    b1) receiving a predetermined password from a user;
    b2) determining a vehicle telephone number pre-stored in the mobile terminal to be a destination, generating a short message composed of a phone number or ID of the mobile terminal, the received password, and an initial information request flag, and transmitting the short message to the vehicle;

b3) receiving a response message from the vehicle which has received the short message and has determined the validity of the initial information request flag using the password contained in the short message; and b4) selecting, by the user checking a displayed menu item, a vehicle's control available item corresponding to the received response message.

9. The method as set forth in claim 8, wherein step (b2) further includes generating a short message where a message classification recognition code indicative of a vehicle control short message is included in a header area.

10. The method as set forth in claim 8, wherein the received response message includes a telephone number of the vehicle, a password pre-registered in the vehicle, and automatic control item information of the vehicle.

11. The method as set forth in claim 8, wherein step (c) includes the steps of:

c1) receiving a desired automatic control item from the user upon receipt of an automatic control request;

c2) reading a control command corresponding to more than one user-selected item from among the automatic control available items, and temporarily storing the read control command;

c3) receiving a user-entry password from the user, comparing a pre-stored password with the user-entry password, and authenticating the user according to the comparison result;

c4) if it is determined that the user is authenticated, determining a pre-registered vehicle telephone number to be a destination, and generating an automatic control short message including a phone number of the mobile terminal, the temporarily-stored control commands, and the password; and c5) transmitting the short message to the vehicle.

12. The method as set forth in claim 11, wherein step (c4) further includes generating a short message where a message classification recognition code indicative of a vehicle control short message is included in a header area.

13. A mobile terminal apparatus, comprising:

a control command manager for storing/managing an automatic control icon pre-registered to implement an automatic control function of a vehicle acting as a control target, control commands associated with the automatic control icon, and authentication information needed to establish mutual authentication between the vehicle and the mobile terminal;

a controller for receiving a request command from a user to establish the vehicle's automatic control function, and generating a control signal needed for the vehicle's automatic control function using a short message communicated between the vehicle and the mobile terminal;

a display controller for reading the automatic control icon from the control command manager upon receiving a control signal from the controller, and displaying the read icon;

a short message generator for generating a short message needed for the vehicle's automatic control function upon receiving the control signal from the controller; and an RF (Radio Frequency) unit for transmitting the short message generated by the short message generator to the vehicle upon receiving the control signal from the controller, receiving a response message from the vehicle, and transmitting the received response message to the controller.

14. The apparatus as set forth in claim 13, wherein the controller, upon receiving a user's request command to implement the vehicle's automatic control function, generates at least one of a plurality of control signals, i.e. an authentication information setup control signal for setting up authentication information communicated between the vehicle and the mobile terminal, an initial information request control signal for requesting initial information needed for the automatic control function from the vehicle, an automatic control execution control signal for carrying out the automatic control function, and a display control signal for controlling a display state.

15. The apparatus as set forth in claim 14, wherein the display controller, upon receiving the display control signal from the controller, displays only an icon corresponding to an automatic control available item of the vehicle in the form of a user-selectable icon.

16. The apparatus as set forth in claim 13, wherein the control command manager further includes malfunction indication icon information indicative of malfunction state information of the vehicle, and stores/manages the malfunction indication icon information.

17. The apparatus as set forth in claim 16, wherein the display controller, upon receiving a display control signal from the controller, determines which one of the vehicle's automatic control icons indicates a current malfunction, reads corresponding malfunction icon information from the control command manager, and displays the read information.

18. The apparatus as set forth in claim 13, wherein the short message generator, upon receiving the control signal from the controller, generates a first short message for setting up authentication information to establish mutual authentication between the vehicle and the mobile terminal, a second short message to request initial information needed for the vehicle's automatic control function from the vehicle, and a third short message for automatically controlling the vehicle.

19. The apparatus as set forth in claim 18, wherein the short message generator generates a short message where a message classification recognition code indicative of a vehicle control short message is included in a header area.

20. The apparatus as set forth in claim 14, wherein the short message generator generates a first short message upon receiving the authentication information setup control signal from the controller, wherein the first short message is composed of a phone number or ID of the mobile terminal and a user-predetermined automatic control authentication password and the destination of the first short message is a vehicle telephone number.

21. The apparatus as set forth in claim 14, wherein the short message generates a second short message upon receiving the initial information request control signal from the controller, wherein the second message is composed of a phone number or ID of the mobile terminal, a user-predetermined automatic control authentication password, and an initial information request flag and the destination of the second short message is a vehicle telephone number.

22. The apparatus as set forth in claim 21, wherein the RF unit receives a short message from the vehicle, as a response message to the second short message, and wherein the short message includes the vehicle telephone number of a corresponding vehicle, the password pre-registered in the vehicle, and automatic control item information of the vehicle.

23. The apparatus as set forth in claim 21, wherein the short message generator generates a third short message upon receiving the control signal from the controller, wherein the third short message includes more than one user-selected automatic control item and a user-predetermined automatic control authentication password, and wherein the destination of the third short message is a vehicle telephone number.

* * * * *